Patented July 4, 1944

2,352,611

UNITED STATES PATENT OFFICE 2,352,611

METHOD OF PREPARING MEAT PRODUCTS

William W. Bowers, Chicago, Ill., assignor to Wilson & Co. Inc., Chicago, Ill., a corporation of Delaware No Drawing. Application September 12, 1941, Serial No. 410,651

3 Claims. (Cl. 99—169)

This invention relates to a meat product and the method of preparing the same, and more particularly to a method of preserving fresh meat.

At present, fresh meat is stored at temperatures slightly above freezing in order to prolong the time during which the meat remains palatable, but in spite of the low-temperature storage, the meat deteriorates rapidly. The period during which meat may be kept satisfactorily at low temperatures differs considerably with the type of meat. For example, livers ordinarily can be kept only about seven days before they begin to give active evidence of deterioration. On the other hand, pork loins can be kept for about eleven days, sweetbreads for about one week, and beef for about two weeks before any considerable odors of decomposition are noticeable.

Other methods of preserving fresh meat have been suggested, including freezing, but these methods have disadvantages and their products have not met generally with public acceptance.

By means of the present invention, meat may be maintained fresh for many times the previous period and at the same time does not dry out, become odorous, or otherwise unsatisfactory, even after long intervals.

In accordance with the invention, fresh meat, for example, a carcass of veal, is dipped in an aqueous solution of gelatin which is maintained at a temperature and strength to produce a very thin coating of gelatin upon and integrally affixed to the meat. The meat is immediately withdrawn from the gelatin solution and the gelatin permitted to set, preferably being assisted by a blast of air. The initial coating of gelatin forming upon the meat has a thickness of about $\frac{1}{32}$ inch and when dry has a thickness of only a few thousandths of an inch. The gelatin forms a bright shiny coating which immensely improves the appearance of the meat.

Veal prepared in this manner may be kept for many weeks without deterioration, whereas ordinarily veal becomes unsatisfactory in a very few days.

Other meat products can be prepared in the same manner. For example, pork loins, which ordinarily begin to deteriorate noticeably after eleven days, have been kept for seventy days without any noticeable deterioration. A quarter of beef has been kept for over fifty days without noticeable deterioration; and lamb has been kept for over fifty days, whereas it normally begins to give trouble in seven days.

In all of these cases the meat was kept unfrozen under ordinary refrigeration conditions of about 31–38° F.

The temperature of the gelatin solution should be maintained between 125 and 165° F., and preferably between 140 and 150° F. At lower temperatures there is a tendency of the solution to produce a gelatin coating which is too thick and does not adhere properly. At temperatures substantially above 165° F., the meat tends to wrinkle and produce an appearance which is not as satisfactory, and the gelatin coating tends to be too thin and uncoated areas appear.

It is preferred to use a gelatin solution which is free from carbohydrate material, otherwise this material will carbonize on cooking the meat, which produces an appearance which is very unsightly.

The preferred solution contains approximately 25% of a high test gelatin, for example, of over 175 Bloom and preferably about 275 Bloom, and the bath is maintained at approximately 145° F. The meat to be treated is preferably cold, for example, at 31–38° F., and will have upon its surface a layer of moisture condensed from the atmosphere. It is preferred not to remove this coating of moisture since it assists in producing proper wetting of the meat. During the dipping operation the meat is preferably suspended by some portion of the meat which is not susceptible to deterioration, as by a bony or sinewy portion thereof.

The meat is dipped in the solution and immediately removed, allowed to drain for a few moments, and is then placed in a blast of air which acts to dry and congeal the gelatin. In a very short time, usually not more than a minute, the gelatin has set sufficiently to permit handling of the product, and it is then placed under refrigeration.

The gelatin layer so produced is strong, tough, and will withstand the customary rough handling given to meat products.

Moreover, the gelatin appears to penetrate into and become part of the uppermost layer or fell of the meat and becomes an integral part thereof. It is, therefore, unnecessary to utilize wetting agents or vacuum treatment in order to secure proper coverage of the meat product, but these extra steps may be included if desired. The meat is completely encased, inside and out, without a gelatin layer coating.

During the first few days after application of the coating, a coated carcass loses weight more rapidly in comparison with an uncoated carcass, but after five to seven days this reverses and the coated meat product loses weight more slowly. The initial rapidity of the loss is due to evaporation from the gelatin coating and not from the meat itself.

The strength of the gelatin, the concentration thereof, and the other factors described, may be altered considerably, but these various factors should be correlated to produce a tough coating which will set under the desired conditions to produce a coating of the desired thickness.

It has heretofore been suggested that cooked or smoked meat be immersed in gelatin solution either for keeping purposes or for appearance. The use of gelatin on such meat products is not entirely satisfactory, however. In the first place gelatin solutions do not adhere well to cooked fat or to smoked fat, although they will adhere to fresh—that is, uncooked or unsmoked fat.

Secondly, if a pure gelatin solution, unmixed with a plasticizing or other agent, is employed, its appearance changes rapidly enough so that it may become very unsightly before a cooked or smoked meat product is used. In practice the present invention has been applied primarily to fresh meat products which are marketed within ten days or two weeks after dipping, during which time the gelatin coating retains its highly pleasing appearance.

Unless the viscosity of the gelatin is maintained at a sufficiently high point, it will not adhere properly to the meat. For example, if the viscosity of the gelatin falls just below the critical limit, the gelatin film may adhere during refrigeration but will peel off of the animal as soon as subjected to room temperature and humidity conditions.

Until about 15 or 20 years ago gelatins were not available commercially which had a viscosity sufficiently high to produce a satisfactory film. For this purpose a gelatin having a Bloom test of at least 175 with a corresponding viscosity of at least 37 is required; and for practical purposes the lower limit should be maintained at a viscosity of 40 and the corresponding Bloom which is approximately 190.

A further difficulty lies in the progressive degradation of the gelatin by heat, while maintained hot in the bath. It has been found essential to maintain the bath at a temperature above 125° F. and preferably above 135° F. in order to afford proper dipping qualities. At these temperatures bacterial growth is inhibited but the gelatin itself, which is protein in character, undergoes degradation at an active rate. This degradation produces other protein or protein-like products, some of which have viscosity-producing or gel-producing properties of a lower order than the gelatin itself, and some of which have no film strength properties at all. All of the degradation products of gelatin inhibit the gel strength of what may be called here "true gelatin." That is, if an ideal "true" gelatin were available, a solution containing 20% of this gelatin would not have the same properties as a 25% solution of a product containing 80% gelatin and 20% degradation products, even though the amount of "true" gelatin was the same in each product and the viscosity of the two solutions might be identical at any given temperature.

Inasmuch as it is obviously impossible to dip large animal sections in a bath so as to use up all of the bath, and since it is quite uneconomical to discard any appreciable portion of the bath, it is essential for commercial purposes to develop a bath which may be used continuously in spite of the progressive degradation of the gelatin therein.

It is also important that a test be developed which will indicate rapidly the condition of the bath since the animal product itself will not show the unsatisfactory character of the coating for many days after application thereof.

It has been discovered that a dipping bath may be continuously maintained under the following conditions:

(1) The concentration of protein solids therein is originally fixed at a predetermined figure. This is normally approximately 25%.

(2) This proportion is maintained by additions of makeup solution of gelatin of the same concentration.

(3) The viscosity of the solution, as measured at a predetermined dilution, preferably at a concentration of 6⅔% solids, is maintained above the minimum which, for the preferred dilution, is 37 millipoises. In determining solids for this purpose, it has been found that all of the protein type solids shall be considered, and it has been further found that if makeup is constantly added at the same concentration as the original, the solid content of the bath remains substantially unchanged. This makes possible a very rapid test since the determination of the percentage of solid content might otherwise take a considerable time.

It has been found that a concentration of approximately 25% gelatin solids should be employed. For this purpose the initial viscosity of the solution is preferably made at least as high as 45 and in practice is made between 50 and 53, as measured by the standard viscosity test for gelatin at a dilution containing 6⅔% solids.

Assuming a bath containing 1200 lbs. of liquid, the bath may originally be made up by using 300 lbs. of approximately 275 Bloom gelatin and 900 lbs. of water. The bath is heated to approximately 145° F. and is maintained constantly at that temperature. The meat is dipped successively into the bath, being completely immersed therein, and is withdrawn and permitted to drip onto an adjacent communicating pan for a few moments, after which it is subjected to a blast of cool air. The meat will remove between about 3% and 5.5% by weight of material from the solution. That is, 100 lbs. of meat will be coated with 3 to 5.5 lbs. of solution. It is, therefore, obvious that dipping 10,000 lbs. of meat will remove approximately 400 lbs. of liquid from the bath. To replace this amount, makeup is added by adding 400 lbs. of solution containing 100 lbs. of gelatin of approximately 275 Bloom, and 300 lbs. of water. However, if, in the meantime, the dipping has proceeded at a slow rate, the solution may have degraded and it is, therefore, tested preferably at least every 12 hours and in any event, as where no dipping occurs during a substantial period, prior to the resumption of dipping. If the viscosity has fallen below 40, sufficient makeup is added at once to produce a solution having a viscosity substantially above the minimum. This is done by adding a 25% solution of the high Bloom gelatin in sufficient quantity to produce an average in the solution above the minimum. As already pointed out, this test is made on the basis of the assumption that all degradation products of gelatin be considered gelatin solids, that is, on the assumption that the solution still is a 25% solution of gelatin. No attempt need be made to determine the true gelatin content of the solution.

In ordinary practice, the bath is sufficiently large so that it will contain any makeup necessary to bring the viscosity up to the proper amount. If for any reason the bath has stood so long that the makeup required would more than fill the bath, the excess may be put in a separate container and added as makeup when space is available. In practice this has never been found necessary.

By proceeding as above outlined, the dipping bath may be used continuously over long periods without any discard except in the event of accident.

In a veal carcass weighing approximately 70 lbs., the added weight of the coating immediately after application will be from 2 to 2.5 lbs., of which approximately 75% is water. After five days to seven days, most of this water has evaporated. The added weight will be about 10 oz. per carcass. The ratio of added gelatin to meat product will of course vary, depending upon the ratio of surface to the mass of the meat; but in general it may be said that the weight of the added gelatin on a dry basis will be about 1% of the weight of the meat.

Beef quarters require coating weighing approximately 3% of the meat. For example, 50 quarters of beef weighing 6916 lbs. total, weighed 7127 lbs. immediately after dipping, or a total initial gain of 11 lbs. which is 3.05% of the original meat.

Veal gains approximately 4% to 4.5%. For example, 55 whole calf carcasses weighing 6125 lbs. gained 258 lbs. on dipping, or 4.25%. If the carcasses are split, the initial gain immediately following the dipping is about 5.5%.

Lambs also gain about 5.5%. For example, 68 lambs weighing a total of 2742 lbs. gained 152 lbs. as measured immediately after dipping, or an average of 5.5%.

As already pointed out, by the time the meat is sold, substantially all of the added weight of the gelatin coating has been lost.

The process also may be used upon fresh killed meat which is still warm. For this purpose a slightly higher concentration of gelatin solution may be employed. The concentration of the solution determines the amount of coating which will adhere. Inasmuch as less material will congeal on a warm carcass than on a chilled one, it is desirable to use a somewhat greater concentration of solution in order to acquire a coating of the same thickness.

This application is a continuation-in-part of my co-pending application, Serial No. 341,062, filed June 17, 1940.

The foregoing detailed description has been given for clearness of understanding only, and no unnecessary limitations should be understood therefrom.

What I claim as new and desire to secure by Letters Patent is:

1. The method of dipping meat which comprises preparing a dipping bath containing a predetermined concentration of gelatin solids having a viscosity at 6⅔% concentration of gelatin solids of at least 37, maintaining the bath at an elevated temperature, successively dipping meat products therein, the gelatin solution becoming progressively degraded under the influence of heat into gelatin degradation products with the passage of time, and always maintaining the bath at a viscosity above 37 when measured at a dilution of 6⅔% solids including the resulting gelatin degradation solids, the bath not being permitted at any time to fall below a viscosity of 27 by additions of gelatin solution of substantially the predetermined concentration and at a viscosity substantially above 37.

2. The method of dipping fresh meat which comprises preparing a dipping bath containing a predetermined concentration of gelatin solids of approximately 25% having a viscosity at 6⅔% concentration of gelatin solids of at least 37, maintaining the bath at an elevated temperature above approximately 140° F. and below approximately 150° F., successively dipping fresh meat products therein, the gelatin solution becoming progressively degraded under the influence of heat into gelatin degradation products with the passage of time, and at all times maintaining the bath at a viscosity above 37 when measured at a dilution of 6⅔% solids including the resulting gelatin degradation solids, by additions of gelatin solution of substantially the predetermined concentration and at a viscosity substantially above 37, the bath not being permitted to fall below a viscosity of 37 at any time.

3. The method which comprises preparing a dipping bath containing a concentration of gelatin solids of approximately 25% and having a viscosity at 6⅔% concentration of gelatin solids of approximately 50 to 53, maintaining the bath at a temperature between 135° F. and 165° F., successively dipping meat products therein over a prolonged period within which the gelatin solution becomes progressively degraded under the influence of heat into gelatin degradation products, and maintaining the bath at all times at a viscosity above 40 when measured at a dilution of 6⅔% solids including the gelatin degradation solids, by addition of gelatin solution of the original viscosity.

WILLIAM W. BOWERS.

Patent No. 2,352,611. CERTIFICATE OF CORRECTION.

July 4, 1944.

WILLIAM W. BOWERS.

It is hereby certified that error appears in the printed specification of the above numbered patent requiring correction as follows: Page 1, second column, line 53, for "without" read --within--; page 3, first column, line 30, for "11 lbs." read --211 lbs.--; and that the said Letters Patent should be read with this correction therein that the same may conform to the record of the case in the Patent Office.

Signed and sealed this 29th day of August, A. D. 1944.

Leslie Frazer (Seal)

Acting Commissioner of Patents.